United States Patent [19]

Bernhardt

[11] 4,063,090

[45] Dec. 13, 1977

[54] METHOD FOR ISOTOPE SEPARATION BY PHOTODEFLECTION

[75] Inventor: Anthony F. Bernhardt, Oakland, Calif.

[73] Assignee: The United States of America as represented by the United States Energy Research and Development Administration, Washington, D.C.

[21] Appl. No.: 519,706

[22] Filed: Oct. 30, 1974

[51] Int. Cl.² .............................................. B01D 59/44
[52] U.S. Cl. .................................... 250/284; 250/253; 250/492 R
[58] Field of Search ................ 204/157.1 R, DIG. 11; 423/19; 250/284, 423 P, 492 R, 253

[56] References Cited

U.S. PATENT DOCUMENTS

| 3,443,087 | 5/1969 | Rabieux et al. | 250/284 |
| 3,558,877 | 1/1971 | Pressman | 250/284 |
| 3,772,519 | 11/1973 | Levy et al. | 250/284 |
| 3,941,670 | 3/1976 | Pratt, Jr. | 204/158 R |

OTHER PUBLICATIONS

Chemical and Engineering News, p. 20, July 12, 1976.
Nuclear Engineering International, vol. 19, p. 68 (Feb. 1974).
"IBM Technical Disclosure Bulletin," vol. 17, No. 11, 3501-3502 (Apr. 1975).
Moore, Accounts of Chemical Research, 6, 323-328, (1973).

Primary Examiner—Edward A. Miller
Attorney, Agent, or Firm—Dean E. Carlson; Roger S. Gaither; Irene S. Croft

[57] ABSTRACT

In the method of separating isotopes wherein a desired isotope species is selectively deflected out of a beam of mixed isotopes by irradiating the beam with a directed beam of light of narrowly defined frequency which is selectively absorbed by the desired species, the improvement comprising irradiating the deflected beam with light from other light sources whose frequencies are selected to cause the depopulation of any metastable excited states.

8 Claims, 4 Drawing Figures

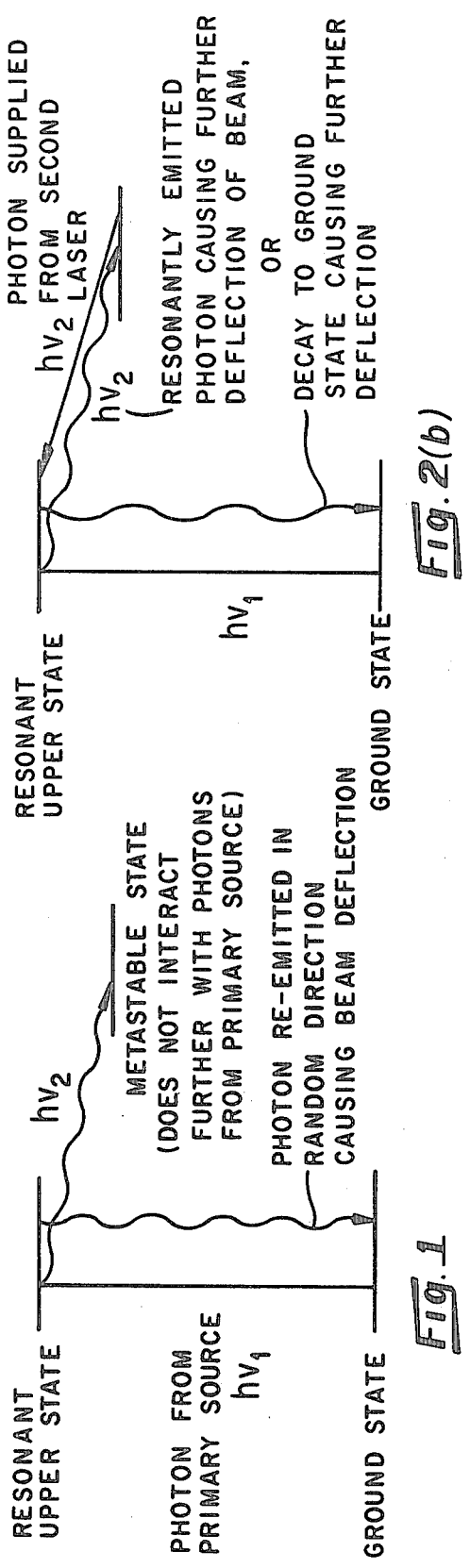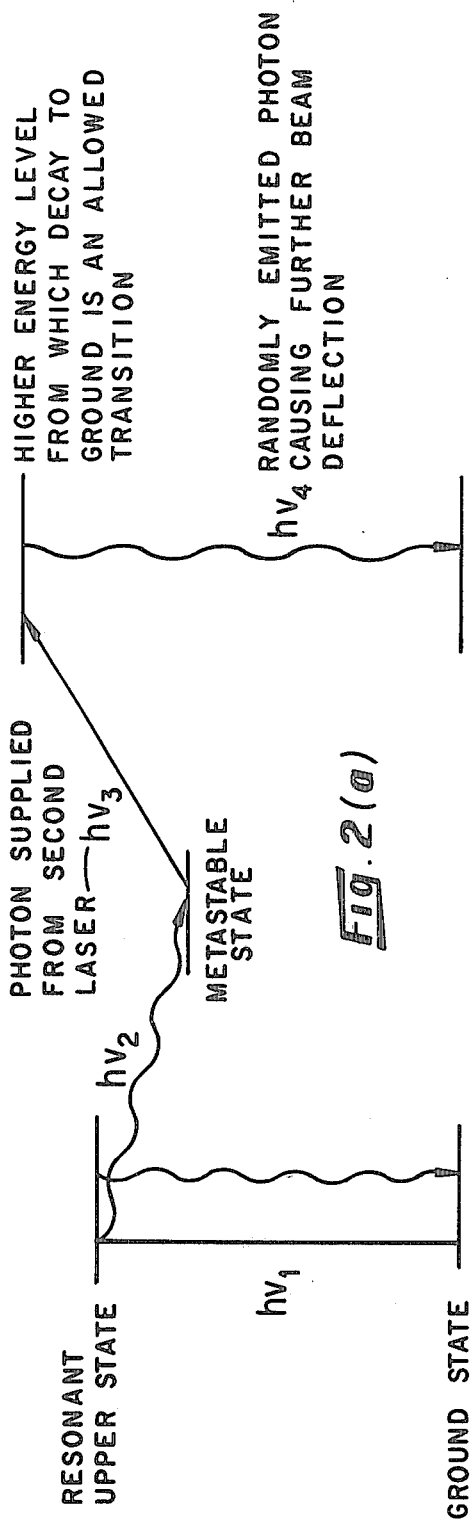

METHOD FOR ISOTOPE SEPARATION BY PHOTODEFLECTION

BACKGROUND OF THE INVENTION

The invention disclosed herein was made in the course of, or under, Contract W-7405-ENG-48 with the United States Atomic Energy Commission.

This invention relates to the separation of particles, particularly the separation of isotope mixtures, by photodeflection.

Mixtures of isotopes of the same element are extremely difficult to separate into the component isotopes. The separation of a mixture of uranium isotopes to provide a component enriched in fissionable $U^{235}$ is an important process for nuclear applications. The principal separation method now used on a commercial scale is the gaseous diffusion method. Many alternative methods have been suggested, such as, for example, electromagnetic separation, centrifugal separation and separation by thermal diffusion.

More recently, it has been proposed to separate isotopes by using a beam of highly monochromatic light, such as laser light, to selectively excite the desired isotope species, as exemplfied by Pressman, U.S. Pat. No. 3,558,877, issued Jan. 26, 1971; Pressman, U.S. Pat. No. 3,740,552, issued June 19, 1973; and Levy et al, U.S. Pat. No. 3,772,519, issued Nov. 13, 1973. The method described in Pressman, U.S. Pat. No. 3,558,877, "Method and Apparatus for Mass Separation by Selective Light Absorption", Jan. 26, 1971, utilizes photodeflection to selectively deflect one isotope species out of a beam of mixed isotopes. According to this method, a beam of highly monochromatic light at a frequency absorbed by one isotope is directed across a beam of a mixture of isotopes including the selectively absorbing one and another or others. Momentum is thus transferred from the photons to the selectively absorbing atoms. Each time an atom absorbs a photon it acquires a momentum $h\nu/c$ in the direction of propagation of the photon. The subsequent re-emission of the photon is generally isotropic and produces no momentum on the average. No momentum in this sense is transferred to the atoms of the other isotopic particles which will not absorb light of the particular frequency used. Two divergent particle beams are thus produced, each enriched in a different isotope with respect to the original stream. The enriched beams can be collected in any conventional manner.

In complex atoms like uranium, there are generally one or more states that lie between the ground and primary excited states which are radiatively accessible (i.e. by electric dipole radiation) to the upper state by a single step or series of steps but which cannot radiatively decay to the ground state. The lifetimes of these metastable states are long compared to the time period during which the atoms may be conveniently exposed to the primary photons and since an atom in a metastable state generally does not interact with the primary beam of photons, continued exposure produces no further angular separation between the atomic beams of different isotope species. This trapping of the atoms in a metastable state severely limits the effectiveness of radiation pressure isotope separation.

It is, therefore, among the objects of this invention to provide a technique for radiation pressure isotope separation whose effectiveness is not limited by the above described metastable state saturation phenomenon.

SUMMARY OF THE INVENTION

In accordance with the present invention, the photodeflection method of particle separation is carried out in the presence of additional light sources which irradiate the selectively absorbing particles with light the frequency of which is selected to cause depopulation of a metastable state. The further absorption of photons by the selectively absorbing particles produces further deflection or renders the particles susceptible to further absorption and, hence, deflection by photons from the primary light source. Specifically, the frequency of the additional light source is tuned to a transition from the metastable state to another state from which decay into the ground state is allowed, thereby causing immediate depopulation of any metastable states. In a particular mode of operation, the frequency of the additional light source is tuned to the transition from the metastable state to the original excited state, with decay to the ground state or to the metastable state causing immediate depopulation of the metastable state.

The present invention is applicable to the separation of particles such as atoms, molecules, or fragments of atoms or molecules, whether charged or uncharged, so long as the particles comprise one species which will selectively absorb light at some particular frequency. This invention is particularly applicable to the separation of isotopes of heavy elements, such as uranium, where population of metastable states is more probable and where the number of photon absorptions and resonances required to achieve a desired angular deflection is greater.

The invention will be described in detail with respect to the accompanying drawings.

BRIEF DESCRIPTION OF THE DRAWINGS

FIG. 1 is a diagrammatic illlustration of metastable state trapping.

FIG. 2(a) is a diagrammatic illustration of metastable state depopulation by a transition to another state from which decay to the ground state is allowed.

FIG. 2(b) is a diagrammatic illustration of metastable state depopulation by transition to the original excited state with decay to the ground state or to the metastable state.

DETAILED DESCRIPTION OF THE INVENTION

Figure 3:
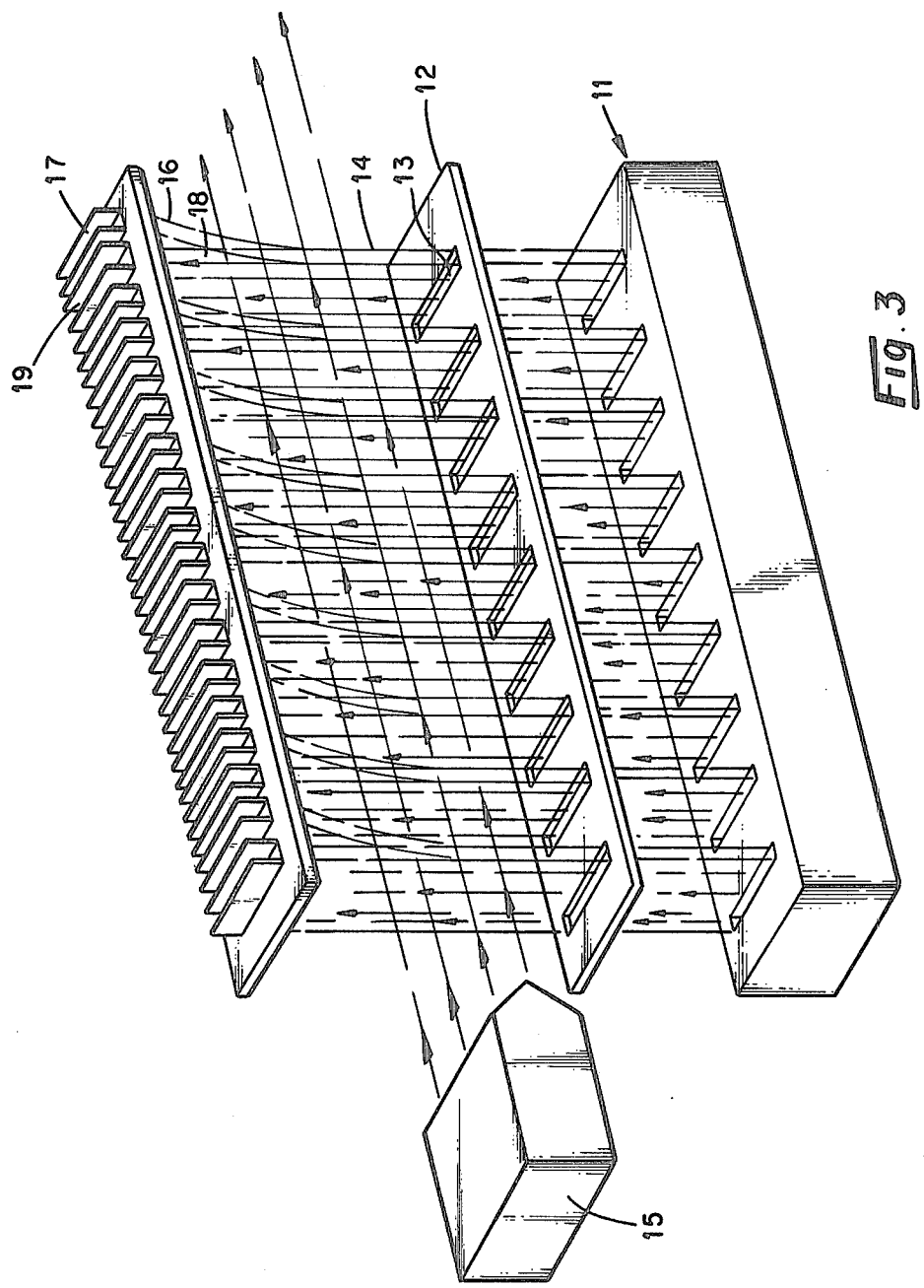
FIG. 3 is a diagrammatic representation of a preferred method of carrying out the process of the present invention.

In accordance with the process of the present invention, a mixture of particles preferably formed into a beam, e.g., an atomic beam of a mixture of isotopes, containing one species which will absorb light of a predetermined frequency and at least one species which will not absorb light of that frequency, is exposed to a directed beam of light from a primary light source having the predetermined frequency so that the light is selectively absorbed by the desired species. Preferably, the light beam is directed substantially normal to the direction of propagation of the particle beam in order to effect maximum separation. It is essential that the primary light source have a frequency appropriate for absorption by the intended isotope species and sufficiently narrowly defined so that the absorption lines of the other isotopes in the mixture are not substantially overlapped. In order to minimize the Doppler spread in the direction of propagation of the particle beam, the particle beam is collimated, preferably to a divergence of from about 1 to about 10 milliradians.

The momentum of the photons in the light beam is transferred to the selectively absorbing particles in the direction of propagation of the light beam, thereby selectively deflecting the desired species out of the particle beam source. The selectively absorbing species is then exposed, preferably simultaneously with exposure to the primary light source, to at least one secondary light source the frequency of which is selected to depopulate any metastable excited states, thereby allowing further beam deflection. Since the particles in the metastable states do not interact substantially with photons in the primary light source, the frequency of the secondary light source must be different from that of the primary light source.

The phenomenon of metastable state "trapping" is illustrated diagrammatically in FIG. 1. Referring to FIG. 1, a photon from a primary light source ($h\nu_1$) is selectively absorbed by an atom of the desired species, thereby raising the atom to an excited state and transferring the momentum of the photon to the atom. The atom may return to the ground, or absorbing, state by spontaneous emission of a photon of the same frequency in a random direction. In the case of many atoms, the net result is deflection of the atomic beam in the direction of propagation of the light. However, the atom may radiate into a metastable state by the emission of a photon of a different frequency ($h\nu_2$). In this metastable state the atom will not interact further with the photons from the primary light source; it becomes "trapped", thereby limiting deflection of the atomic beam.

Possible energy level transition schemes for depopulation of the metastable state are shown diagrammatically in FIGS. 2(a) and 2(b). In FIG. 2(a), a photon from a secondary light source ($h\nu_3$) is absorbed by the atom in the metastable state to raise the atom to a higher energy level, other than the original excited state, from which decay to the ground, or absorbing, state is an allowed transition, thereby causing further atomic beam deflection. In FIG. 2(b) a photon from secondary light source ($h\nu_2$) raises the atom from the metastable state to the original excited state. The atom may then decay to the ground state or it may decay to the metastable state by resonant emission of a photon. In either case, further deflection of the atomic beam is effected.

A preferred form of light source for the process of the present invention is the laser, preferably a continuous laser source. The type of laser used can be solid state, gas, liquid, or chemical, followed by apparatus for shifting and tuning the output to the desired spectral line. Suitable light sources are well known in the art and are available commercially. Finely tunable chemical dye lasers are presently available and are particularly suitable.

For maximum effectiveness, irradiation by the primary light source and the secondary light source is effected concurrently using a mixed beam of photons. In order to be completely effective, the deflected beam is best exposed to laser light of sufficient intensity to saturate the relevant transition out of the metastable state everywhere along the atomic beam. A suitable arrangement of light sources is shown in FIG. 3.

Referring now to FIG. 3, the numeral 11 refers to a trough-like source of particles such as atoms. The source 11 may comprise a conventional atomic or molecular beam source such as a thermal evaporator, a thermal effuser, a laser evaporator, an ion-sputtering device, an electron-sputtering device, or the like. The beam of particles from source 11 then passes through collimator 12 which is provided with conventional slits 13 to form collimated particle beam 14. The slits 13 confine the particle beam emerging from source 11 and prevent lateral spreading thereby minimizing the Doppler spread. A light beam, from light source 15, containing a mixed beam of photons from primary and secondary light sources is then directed laterally across the collimated particle beam 14 so as to intersect the beam at approximately right angles. The arrows from light source 15 indicate a mixed flux of photons from primary and secondary light sources spatially expanded to provide a reasonable match of the photon flux density to the requirement for deflection and metastable state depopulation.

The primary light source is limited to a narrowly defined frequency that will be selectively absorbed by one species, such as one isotope species, in the particle beam. The light-absorbing particles receive a momentum contribution in the direction of propagation of the beam from source 15 and will form a deflected beam. The secondary light source is tuned to a frequency which will cause depopulation of any metastable excited states by means of possible energy level transitions as shown in FIGS. 2(a) and 2(b), thereby causing further deflection of the beam. Some atomic systems may require more than one secondary light source in order to depopulate all metastable excited states. The net result is deflected beam 16 which will be highly enriched in the selectively absorbing isotope species. This beam can then be collected by conventional means in collection chamber 17. The undeflected particle beam 18, depleted in the absorbing isotope species, can be collected in a similar manner in collection chamber 19.

The present process is preferably carried out in a vacuum in order to eliminate the disturbing effects of air. For example, particle beam source 11 may be attached to a conventional vacuum chamber (not shown) which can enclose the collimator and particle beams. The light source 15 can be connected to the vacuum chamber in communication with a window of optically transparent material in the wall of the chamber in a manner which is well known in the art. Although a collimated, particle beam is preferred, the present invention is applicable to the separation of a particle mixture which can be directed into a stream by any conventional method.

EXAMPLE I

Barium metal, with the natural mixture of isotopes, was evaporated in an oven. The vapor was collimated to a 2 milliradian divergence and a laser beam was then directed across the collimated barium beam at right angles thereto. The laser beam was expanded in the vertical direction to drop its intensity to below the saturation intensity of the line and thus prevent unnecessary photon losses due to stimulated emission. The primary laser source was a CW dye laser frequency-tuned using an intracavity prism and etalon, with piezoelectric mirror and etalon drives. Its linewidth was 10 MHz. The laser's etalon and mirror drives were locked to a temperature-stabilized, high finesse spectrum analyser in the usual fashion and a laser frequency stability of ±10 MHz was thereby attained. The dye used was rhodamine 6G in a 3:1 water-hexafluoro-2-propanol mixture, employed to blueshift the rhodamine fluorescence peak to near the green 5535 A barium resonance line. In single line operation the laser had 50 mW output using 1.8 watts of all-line argon pumping.

The primary laser source was tuned to a frequency for selective absorption by the isotope, $^{138}$Ba. The resonant transition utilized was Ba(I) $6s^2\ ^1S_0 \rightleftarrows 6s6p^1P_1$ at 5535 A. Deflection of $^{138}$Ba was observed visually and mass spectrometrically. It was found, however, that metastable state trapping limits the magnitude of photodeflection when a single laser beam frequency is used: resonant scattering terminates when a barium atom radiates from the $6s6p^1P_1$ state into the metastable $6s5d^1D_2$ state from whence dipole radiation to the ground state is parity-forbidden. When the center of the laser line was a few tens of megahertz away from the $^{138}$Ba absorption peak, a bright green fluorescing atomic beam was observed; when the laser was then tuned onto the absorption peak, the intensity of scattered light from the upper portion of the atomic beam decreased markedly due to optical pumping of the $^{138}$Ba into the metastable state. A second dye laser, tuned to the 5826 A $6s5d^1D_2 \rightarrow 6p5d^1P_1$ transition, was used to depopulate the metastable state. With a 3 mm diameter laser beam at 5826 A strong yellow-orange fluorescence of the interaction region in the atomic beam at 5826 A was observed when and only when the 5535 A beam was tuned to the $^{138}$Ba absorption maximum. With the 5826 A laser beam expanded in a manner similar to the green beam, simultaneous irradiation shifted the position of the fluorescing atomic beam further in the direction of the laser beam propagation than with the green beam alone. For an atomic beam with a 2 milliradian divergence, this shift was equal to the beam divergence. This effect was still observed with a 10 mrad atomic beam divergence.

EXAMPLE II

The present invention is particularly applicable to the separation of isotopes of uranium where population of metastable states is more probable. Uranium metal containing a naturally occurring mixture of isotopes can be vaporized by conventional means, such as thermal evaporation, to provide a uranium atomic beam source. As a result of the high temperature necessary to vaporize the uranium, a significant fraction of the uranium atoms are raised to the 620 cm$^{-1}$ level. The probability of a transition from the upper resonance level to this 620 cm$^{-1}$ level can be of a magnitude comparable to the transition to the ground state. Therefore, for most effective separation, the primary laser source is tuned to a frequency which will selectively excite uranium 235 atoms to an upper resonant level from which decay to the 620 cm$^{-1}$ is allowed. A second laser source is tuned to the transition between this upper resonant level and the 620 cm$^{-1}$ level to continuously depopulate the latter by the energy level transition scheme illustrated in FIG. 2(b). Concurrent irradiation with the primary and secondary laser sources will selectively deflect the uranium 235 atoms and produce a particle beam enriched in U$^{235}$ which can then be collected by conventional means.

The process of the present invention is general, in the sense that it is possible to separate not only atoms, but also molecules wherein different isotopic composition produces similar isotope shifts in the molecular electronic states. A further application of the present technique is the laser separation of nuclear isomeric states for gamma ray laser applications. The latter application is possible because different isomeric states exhibit similar small differences in the positions of their electronic levels as do different isotopes.

Although the invention has been described with reference to preferred embodiments, various modifications will occur to those skilled in the art, all of which may be achieved without departing from the spirit and scope of the invention as defined by the following claims.

What I claim is:

1. A method for separating a mixture of isotopes of the same element, one of said isotopes having the property that it will absorb light of a predetermined frequency and be raised thereby from an initial energy state to a primary excited state from which there is a significant probability of radiative decay to a metastable excited state and at least one other of said isotopes having the property that it will not absorb light of said predetermined frequency which comprises:
    a. forming a directed beam of vapor consisting essentially of atoms of said isotopes;
    b. irradiating the isotope beam with a primary directed beam of light of said predetermined frequency, the light absorbing atoms being thereby raised to said primary excited state from which a portion of the thus excited atoms radiatively decays into a metastable excited state and another portion of the thus excited atoms radiatively decays into the initial energy state;
    c. simultaneously with step (b), irradiating the light absorbing atoms with a secondary directed beam of light having a frequency substantially different from that of said primary beam and so selected as to cause depopulation of the metastable excited state, said light absorbing atoms being deflected toward a predetermined location as a result of said primary and said secondary irradiation steps; and
    d. collecting the deflected atoms at said predetermined location.

2. A method according to claim 1 wherein the isotope mixture is a mixture of barium isotopes.

3. A method according to claim 1 wherein said primary beam of light and said secondary beam of light are laser beams.

4. A method according to claim 1 wherein the isotope mixture is a mixture of uranium isotopes.

5. A method according to claim 1 wherein the mixture of uranium isotopes is a mixture comprising uranium-235 and uranium-238 and wherein uranium-235 is the selectively absorbing isotope.

6. A method according to claim 1 wherein the frequency of the secondary beam of light is selected to radiate the atoms from the metastable excited state to said primary state.

7. A method according to claim 1 wherein the isotope beam is collimated.

8. A method according to claim 1 wherein said primary and secondary beams of light are substantially colinear and are directed substantially normal to the direction of propagation of the gaseous beam.

* * * * *